United States Patent [19]
Heikinheimo

[11] 3,897,870
[45] Aug. 5, 1975

[54] APPARATUS FOR SINGLE FEEDING EVENLY WIDE TIMBER

[75] Inventor: Olli Heikinheimo, Helsinki, Finland

[73] Assignee: Plan-Sell Oy, Helsinki, Finland

[22] Filed: June 21, 1974

[21] Appl. No.: 481,848

[30] Foreign Application Priority Data
Aug. 20, 1973 Finland.............................. 2598/73

[52] U.S. Cl. ................. 198/241; 198/211; 214/1 Q
[51] Int. Cl. ............................................ B65g 25/00
[58] Field of Search................... 198/237, 241, 211; 214/1 Q, 1 QE

[56] References Cited
UNITED STATES PATENTS
2,154,476   4/1939   Simpson........................ 198/241 X
2,527,024   10/1950  Mitchell.............................. 198/237

Primary Examiner—Richard A. Schacher
Attorney, Agent, or Firm—Cushman, Darby & Cushman

[57] ABSTRACT

An apparatus for individual feeding of evenly wide timber which is supported on a first transversal conveyor as a single-layered mat from the first conveyor to a second transversal conveyor is disclosed, the apparatus having a propeller which has been provided with substantially radial points and which can be rotated around substantially transversal, horizontal shaft between the ends of the conveyors to lift the pieces of timber and to transfer them from the first conveyor onto the second conveyor.

A limiting member is fitted next to the propeller to stop the timber on the first conveyor and there is also an adjusting member to adjust that side of the limiting member which faces the first conveyor to the distance from the tip of the point determined by the width of the pieces of timber to be handled, seen in the direction of the first conveyor.

2 Claims, 1 Drawing Figure

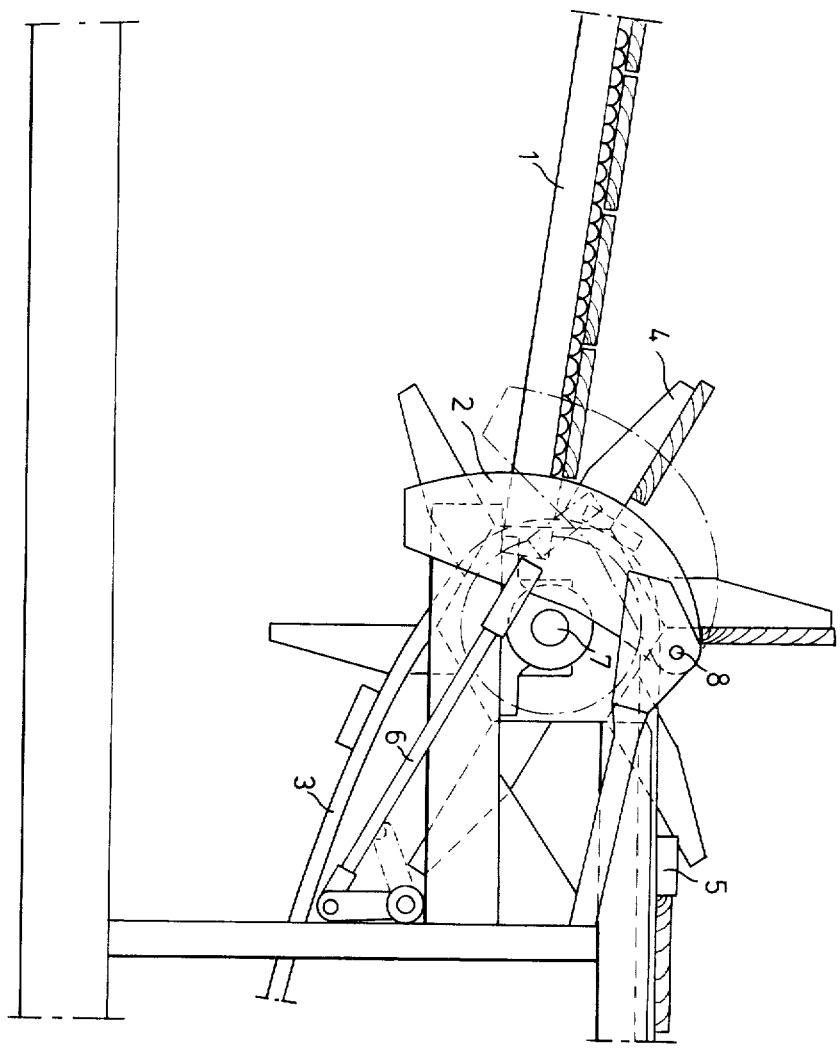

APPARATUS FOR SINGLE FEEDING EVENLY WIDE TIMBER

BACKGROUND OF THE INVENTION

1. Field of the Invention

The present invention relates to an apparatus for individual batching of evenly wide timber, especially sawn timber, supported by one transversal conveyor as a single-layered mat onto a second transversal conveyor.

2. Description of the Prior Art

In a previously known device of the above type a parallel endless transfer conveyor has been placed between the ends of the first and the second transversal conveyors; this conveyor has points which protrude perpendicularly from the conveyor level at intervals of at least the width of the timber to be handled, whereby each point in turn lifts the piece of timber at the end of the first conveyor and transfers it towards the second one. A guide fitted next to the conveyor lifts the piece of timber, fallen on its side between the points, upwards between the points while the piece of timber is transferred towards the second conveyor, and finally yields one piece of timber at a time onto the second conveyor.

In this known device the length of the points and their distance from each other have been dimensioned for sawn timber of a certain width, and therefore its use is limited to batching this timber. The distance between the points is also relatively great, for which reason the passing frequency of the points at the outlet end of the first conveyor remains relatively low even if the velocity of the transfer conveyor is great, which naturally keeps the capacity of the device low.

The object of the present invention is to eliminate the above disadvantages and to provide an apparatus for the individual batching of evenly wide timber, especially sawn timber.

SUMMARY OF THE INVENTION

According to the invention a limiting member is fitted to the frame at the side of the propeller with one side facing the first conveyor to stop the timber on the first conveyor and an adjusting member is fitted between the frame and the limiting member for actuating the limiting member and adjust the effective length of the propeller extensions in the direction of the first conveyor, according to the timber width.

BRIEF DESCRIPTION OF THE DRAWING

The appended FIGURE shows a side-view of a preferred embodiment of the invention with the limiting member in two different positions.

DESCRIPTION OF THE PREFERRED EMBODIMENT

In the drawing, the first transversal conveyor is indicated by 1, and it is a roller track which is slanted downwards in the moving direction of the timber and on which the sawn timber moves as a single-layered, uninterrupted mat. After the outlet end of the first conveyor 1 there is, as its continuation, a second transversal conveyor, which is indicated by 3 and which is a conventional chain or belt conveyor with thrusting members 5 at regular intervals; one piece of sawn timber at a time is meant to be batched between these members 5. In addition, a propeller provided with radial points 4 has been attached with bearings to the shaft 7 of the turning wheel of the endless conveyor 3 so that it can be rotated; its points extend one at a time under the piece of timber at the outlet end of the first conveyor 1 to lift it from the conveyor 1 and to transfer it, the propeller turning clockwise, onto the second conveyor 3, where the thrusting member 5 of the conveyor 3 moves the piece of timber away from under the desceinding point 4. In a propeller according to the invention the distance between the points 4 may be small, but it must be greater than the thickness of the pieces of timber to be handled.

The length of the points 4 is selected preferably at least as great as the width of the widest possible piece of timber to be handled. When narrower pieces are batched, the effective length of the points is adjusted at the first conveyor 1 approximately equal to the width of the pieces of timber to be handled so that a point 4 lifts only the first piece of timber from the conveyor 1. The adjustment is achieved by means of a limiting member 2 which is next to the propeller, which has been articulated to the frame of the device above the shaft 7 so that it can turn around the transversal horizontal pin 8, and of which the side facing the conveyor 1 is curved and preferably extends at least to the highest point of the turning movement of the piece of timber in order to support the piece of timber during this turning movement.

The distance of the curving stop surface of the limiting member 2 from the tip of the point 4 at the level of the conveyor 1 is adjusted by means of an arm 6, one end of which has been connected to the frame and the opposite end to the limiting member to turn the latter around the pin 8 when the effective length of the arm 6 is changed.

What is claimed is:

1. An improved apparatus for single feeding evenly wide timber and of the type having a base; a frame on a base; a first conveyor attached to the frame for feeding the timber transversally as a single layer mat thereon; a second conveyor attached to the frame for transversal single feeding the timber transferred from the first transversal feed conveyor to the second transversal single feed conveyor; a propeller rotatably attached to the frame between the first and second conveyors by means of a substantially transversal horizontal shaft and having substantially radial extensions adapted to lift the timber one at a time from the first conveyor and transfer the timber onto the second conveyor; and means for actuating the conveyors and propeller, the improvement comprising:

a limiting member fitted to the frame beside the propeller and having a side facing the first conveyor to stop the timber on the first conveyor; and adjusting means fitted to the limiting member and the frame in order to spatially adjust the side of the limiting member in relation of the tip of the extension seen in the direction of the first conveyor, in accordance with the width of the timber in that direction.

2. The improvement of claim 1, in which the limiting member is a lever arm one end of which has been attached with bearings to the frame so that it can turn around a substantially transversal, horizontal axis and of which the side facing the first conveyor is curved, and the adjusting means is an adjustable arm one end of which has been connected to the frame and the other end to the limiting member at a distance from said one end of the limiting member.

* * * * *